(12) United States Patent
Okabe et al.

(10) Patent No.: US 7,407,224 B2
(45) Date of Patent: Aug. 5, 2008

(54) MOLDING ATTACHING STRUCTURE, MOLDING ATTACHING CLIP, AND MOLDING

(75) Inventors: Kenji Okabe, Aichi (JP); Tsukasa Murase, Aichi (JP); Keiichi Fukushima, Aichi (JP); Masahiro Kuwabara, Aichi (JP); Noriyuki Miyata, Aichi (JP)

(73) Assignees: Tokai Kogyo Co., Ltd., Obu (JP); Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 10/590,051

(22) PCT Filed: Feb. 22, 2005

(86) PCT No.: PCT/JP2005/003254

§ 371 (c)(1),
(2), (4) Date: Mar. 22, 2007

(87) PCT Pub. No.: WO2005/082670

PCT Pub. Date: Sep. 9, 2005

(65) Prior Publication Data

US 2007/0182214 A1 Aug. 9, 2007

(30) Foreign Application Priority Data

Feb. 26, 2004 (JP) .............................. 2004-051671

(51) Int. Cl.
*B60J 7/00* (2006.01)
*B42F 1/00* (2006.01)
(52) U.S. Cl. ............................ 296/210; 24/457; 24/297; 24/293; 24/628
(58) Field of Classification Search ................. 296/210; 24/457, 297, 293, 628
See application file for complete search history.

(56) References Cited

U.S. PATENT DOCUMENTS

| 6,273,983 | B1 | 8/2001 | Miyakawa et al. |
| 6,668,430 | B2 | 12/2003 | Ichimaru |
| 2002/0138956 | A1 | 10/2002 | Ichimaru |

FOREIGN PATENT DOCUMENTS

DE      3544217 A1   6/1987

(Continued)

*Primary Examiner*—Joseph D Pape
(74) *Attorney, Agent, or Firm*—Oliff & Berridge, PLC

(57) ABSTRACT

A molding attaching clip 30 includes a fixed portion 31 to be fixed in a groove 15 of a roof panel 10, a pair of elastically deformable wall portions 32 which are erected from the fixed portion 31, a pair of engaging portions 33 which are provided on the pair of wall portions 32, and an elastically deformable guide portion 36 which is projected from the fixed portion 31. A roof molding 20 includes a head portion 21 for covering the groove 15, and a projected portion 27 which is protruded from a back face of the head portion 21. The projected portion has a pair of locking portions 24 which are provided on both side faces thereof, and a receiving groove 26 which is formed in the projected portion 27. On occasion of engaging the roof molding 20 with the molding attaching clip 30, the roof molding 20 is positioned so that the pair of locking portions 24 can be engaged with the pair of engaging portions 33, by butting the receiving groove 26 against the guide portion 36.

17 Claims, 9 Drawing Sheets

FOREIGN PATENT DOCUMENTS

| | | | |
|---|---|---|---|
| JP | A 49-19258 | 2/1974 |
| JP | B 6-50934 | 7/1994 |
| JP | A 8-040152 | 2/1996 |
| JP | A 9-505334 | 5/1997 |
| JP | A 2000-117808 | 4/2000 |
| JP | A 2002-283930 | 10/2002 |
| JP | A 2002-347533 | 12/2002 |
| JP | A 2003-72508 | 3/2003 |

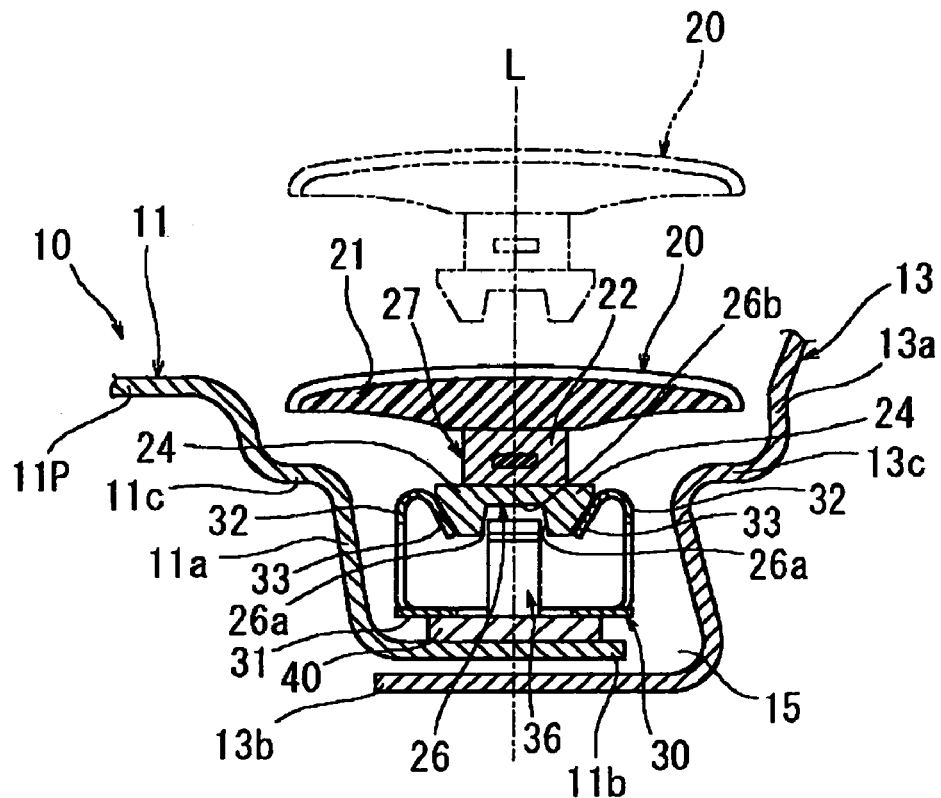
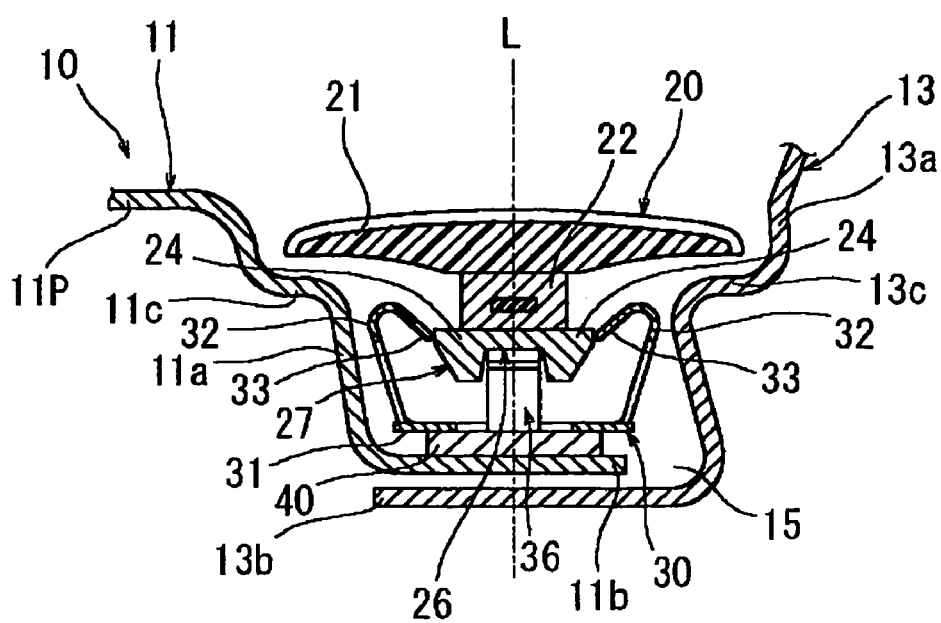

US 7,407,224 B2

MOLDING ATTACHING STRUCTURE, MOLDING ATTACHING CLIP, AND MOLDING

TECHNICAL FIELD

The present invention relates to a molding attaching structure, a molding attaching clip, and the molding.

BACKGROUND ART

As an example of prior art, a case where a roof molding is attached to a roof panel of an automobile employing a molding attaching clip will be described.

As shown in FIG. 9A, a roof panel 110 of an automobile is formed by connecting a side edge portion of a side panel 113 to a side edge portion of a center panel 111 by welding or so. A concave groove 115 which is concaved downwardly is formed in a connected portion between the panels.

Also, a roof molding 120 has a head portion 121 for covering the groove 115, a protruded portion 122 which is protruded from a back face of the head portion 121 into the groove 115, and a pair of right and left (right and left in a lateral direction of the roof molding) locking portions 124 which are provided on both side faces of the protruded portion 122.

Further, a molding attaching clip 130 has a fixed portion 131 in a substantially plate-like shape, and a pair of right and left wall portions 132 which are elastically deformable and provided so as to be erected from both right and left side portions of the fixed portion 131 (both right and left side portions of the concave groove in a lateral direction), and a pair of right and left engaging portions 133 which are provided on opposed faces of the pair of wall portions 132 at their upper ends. By attaching the fixed portion 131 to a bottom face of the groove 115 of the roof panel 110 by bonding means 140 in advance, the molding attaching clip 130 is attached in the groove 115 of the roof panel 110.

When the above described roof molding 120 is attached to the roof panel 110, the roof molding 120 is inserted into the groove 115 of the roof panel 110 from a state as shown by a two-dot chain line 120 in FIG. 9A. On this occasion, both the locking portions 124 of the roof molding 120 are butted on both the engaging portions 133 of the molding attaching clip 130 (See a solid line 120 in FIG. 9A). As the roof molding 120 is inserted into the groove 115 from this state, both the engaging portions 133 are pressed by both the locking portions 124 so as to spread outwardly, whereby both the wall portions 132 of the molding attaching clip 130 are elastically deformed in a spreading direction (See FIG. 9B). Then, as both the locking portions 124 pass by both the engaging portions 133, both the wall portions 132 are elastically restored, whereby the engaging portions 133 engages with the locking portions 124 (See FIG. 9C). In this manner, the roof molding 120 is attached to the roof panel 110.

Incidentally, a molding attaching structure similar to the above described structure is disclosed, for example, in JP-A-8-40152.

DISCLOSURE OF THE INVENTION

In the above described molding attaching structure, in a case where an inserted position of the roof molding 120 (a centerline of the roof molding) is aligned with an attaching centerline 100L, as shown in FIG. 9A, both the locking portions 124 of the roof molding 120 can be properly engaged with both the engaging portions 133 of the molding attaching clip 130 (See FIG. 9C), as described above. Accordingly, the roof molding 120 can be attached to the roof panel 110 in normal condition.

However, during attaching work of the molding, the clip or the locking portions are sometimes in a blind spot and cannot be visually recognized by a worker, and so, the inserted position of the roof molding 120 (the centerline of the roof molding) may be displaced from the attaching centerline 100L in some cases (See FIG. 10A). For example, a case where the inserted position of the roof molding 120 is displaced from the attaching centerline 100L to the right in a lateral direction (the right side in the drawing) will be described. In this case, when the roof molding 120 is inserted into the groove 115 of the roof panel 110, the locking portion 124 of the roof molding 120 at the right side is butted against the engaging portion 133 of the molding attaching clip 130 at the right side (See FIG. 10A). When the roof molding 120 is further inserted into the groove from this state, the roof molding 120 is inclined downwardly to the left, while the locking portion 124 at the right side is butted against the relevant engaging portion 133 (See FIG. 10B). Therefore, when the roof molding 120 is further pushed in, the locking portion 124 of the roof molding 120 at the left side passes by the engaging portion 133 of the molding attaching clip 130 at the left side to be brought into a false engaged state. However, it sometimes happens that the locking portion 124 at the right side does not pass by the engaging portion 133, and both the portions are not engaged, resulting in a so-called "one-side lock" (See FIG. 10C).

Therefore, according to the above described prior art, there has been such anxiety that incomplete engagement such as the one-side lock may happen, in the case where the inserted position of the roof molding 120 is displaced with respect to the molding attaching clip 130. In order to prevent the above described incomplete engagement, the worker is compelled to have considerable skill and to pay excessive attention.

An object of the invention is to provide a molding attaching structure and a molding attaching clip, with which a molding can be reliably attached to a panel even in a case where an inserted position of the molding is displaced, and the molding.

A molding attaching structure according to a first aspect of the invention includes: a molding attaching clip fixed to a panel; and a molding which engages with the molding attaching clip fixed to the panel to thereby be fitted along a concave groove formed in the panel so as to cover the groove from outside, wherein the molding attaching clip comprises a fixed portion fixed in the groove of the panel, a pair of elastically deformable wall portions erected from the fixed portion in a direction away from a bottom face of the groove of the panel and separated from each other in a state where the fixed portion is attached to the panel, a pair of engaging portions provided on the pair of wall portions, and an elastically deformable guide portion projected from the fixed portion in a direction away from the bottom face of the groove of the panel, wherein the molding comprises a head portion for covering the groove of the panel, and a projected portion protruded from a back face side of the head portion into the groove of the panel, the projected portion including a protruded main body, a pair of locking portions provided on both side faces of the protruded main body and engaged with the pair of engaging portions of the molding attaching clip by means of elastic deformation of the wall portions, and a receiving groove which is formed on a lower face of the projected portion and into which the guide portion of the molding attaching clip can enter, and wherein, when engaging the molding with the molding attaching clip, the molding is positioned so that the pair of locking portions can be engaged with the pair of engaging portions, by butting the receiving groove of the molding against the guide portion.

According to the molding attaching structure configured in this manner, on occasion of engaging the molding with the molding attaching clip, the molding is positioned so that the pair of locking portions of the molding and the pair of engaging portions of the molding attaching clip take relative positions in which they can be engaged with each other, by butting the receiving groove of the molding against the guide portion of the molding attaching clip. Therefore, even in the case where the inserted position of the molding is displaced, it is possible to reliably attach the molding to the roof panel.

A molding attaching clip according to a second aspect of the invention is a molding attaching clip for attaching a molding to a panel by being engaged with the molding to be fitted along a concave groove formed in the panel so as to cover the groove from outside, the molding attaching clip including: a fixing portion to be fixed in the groove of the panel; a pair of elastically deformable wall portions erected from the fixing portion in a direction away from a bottom face of the groove of the panel and separated from each other in a state where the fixing portion is attached to the panel; and a pair of engaging portions provided on the pair of wall portions to be engaged with a pair of locking portions provided on the molding by means of elastic deformation of the wall portions, wherein the fixing portion comprises an elastically deformable guide portion projected from the fixing portion in a direction away from the bottom face of the groove of the panel and adapted to enter into a receiving groove which is formed in the molding, and wherein, when engaging the molding, the molding is positioned so that the pair of locking portions can be engaged with the pair of engaging portions, by butting the receiving groove of the molding against the guide portion.

According to the molding attaching clip configured in this manner, when the molding attaching clip is engaged with the molding, the molding is positioned so that the pair of locking portions of the molding and the pair of engaging portions of the molding attaching clip take relative positions in which they can be engaged with each other, by butting the receiving groove of the molding against the guide portion. Therefore, even in the case where the inserted position of the molding is displaced, it is possible to reliably attach the molding to the panel.

According to a molding attaching clip in a third aspect of the invention, the engaging portions are respectively formed on opposed faces of the pair of wall portions by folding back the wall portions in a turned-back manner.

According to a molding attaching clip in a fourth aspect of the invention, the engaging portions are respectively formed at upper ends of the opposed faces of the pair of wall portions by folding back the wall portions in a turned-back manner, and the engaging portion provided on one of the walls is inclined diagonally downwardly toward the other wall portion, while the engaging portion provided on the other wall portion is inclined diagonally downwardly toward the one wall portion.

According to a molding attaching clip in a fifth aspect of the invention, a thermosetting double-faced adhesive tape is further provided on a back face of the fixing portion.

According to a molding attaching clip in a sixth aspect of the invention, the guide portion is formed by cutting and erecting a part of the fixing portion.

According to a molding attaching clip in a seventh aspect of the invention, the guide portion has a curved portion in a substantially circular arc shape at its tip end side, and a tip end portion of the guide portion is folded diagonally downwardly from the curved portion.

Moreover, a molding according to an eighth aspect of the invention is a molding to be attached to a panel along a concave groove formed in the panel by being engaged with a molding attaching clip provided in the concave groove so as to cover the groove from outside, the molding including: a head portion for covering the groove of the panel; and a projected portion protruded from a back face side of the head portion into the groove of the panel, wherein the projected portion comprises a protruded main body, and a pair of locking portions provided on both side faces of the protruded main body and adapted to be engaged with a pair of engaging portions provided on the molding attaching clip by means of elastic deformation of the wall portions, wherein the projected portion has on its lower face a receiving groove into which an elastically deformable guide portion provided on the molding attaching clip can enter, and wherein, when engaging with the molding attaching clip, the molding is positioned so that the pair of locking portions can be engaged with the pair of engaging portions, by butting the receiving groove of the molding against the guide portion.

According to the molding configured in this manner, when the molding is engaged with the molding attaching clip, the molding is positioned so that the pair of locking portions of the molding and the pair of engaging portions of the molding attaching clip take relative positions in which they can be properly engaged, by butting the receiving groove of the molding against the guide portion of the molding attaching clip. Therefore, even in the case where the inserted position of the molding is displaced, it is possible to reliably attach the molding to the panel.

According to a molding in a ninth aspect of the invention, the locking portions are formed symmetrically by injection molding on the extrusion molded protruded main body.

According to a molding in a tenth aspect of the invention, each of the locking portion has a locking face which forms its upper face, and an inclined face which extends diagonally downwardly from an outer end of the locking face so as to reduce a width of the locking portion as it extends a downward direction.

According to a molding in an eleventh aspect of the invention, the receiving groove has a trapezoidal sectional shape.

According to a molding in a twelfth aspect of the invention, the head portion has a durometer hardness of HDA 60 to 80 according to JIS K 7215, and the projected portion has a durometer hardness of HDA 80 to 95 according to JIS K 7215.

According to a molding in a thirteenth aspect of the invention, the head portion has a surface layer integrally formed on its surface, and the surface layer has a durometer hardness of HDD 40 to 50 according to JIS K 7215.

According to a molding in a fourteenth aspect of the invention, the molding is a roof molding to be fitted along a groove on a roof of a vehicle.

According to the molding attaching structure, the molding attaching clip, and the molding of the invention, even in the case where the inserted position of the molding is displaced, it is possible to reliably attach the molding to the panel.

BRIEF DESCRIPTION OF THE DRAWINGS

FIGS. 3A to 3C show a molding attaching clip, in which FIG. 3A is a plan view, FIG. 3B is a longitudinal sectional view taken along a line B-B in FIG. 3A, and FIG. 3C is a cross sectional view taken along a line C-C in FIG. 3A.

FIGS. 4A and 4B show a process for attaching the roof molding to a position corresponding to FIG. 2, in which FIG. 4A is a sectional view showing a state where the roof molding has come into contact with the molding attaching clip, and FIG. 4B is a sectional view showing a state where both wall portions of the molding attaching clip have been elastically deformed.

FIGS. 5A and 5B show a process for attaching the roof molding in a state where an inserted position of the roof molding is displaced, in which FIG. 5A is a sectional view showing a state where the inserted position of the roof molding has been displaced, and FIG. 5B is a sectional view showing a state where the roof molding has been inclined.

FIGS. 9A to 9C show a process for attaching the roof molding according to prior art, in which FIG. 9A is a sectional view showing a state where the roof molding has come into contact with the molding attaching clip, FIG. 9B is a sectional view showing a state where both wall portions of the molding attaching clip have been elastically deformed, and FIG. 9C is a sectional view showing a state where attaching of the roof molding has been completed.

FIGS. 10A to 10C show a process of occurrence of one-side lock of the roof molding according to the prior art, in which FIG. 10A is a sectional view showing a state where the inserted position of the roof molding has been displaced, when the roof molding has come into contact with the molding attaching clip, FIG. 10B is a sectional view showing a state where the roof molding has been inclined, when the roof molding has been further inserted, and FIG. 10C is a sectional view showing the roof molding in a state of the one-side lock, after attaching of the roof molding has been completed.

BEST MODE FOR CARRYING OUT THE INVENTION

Now, the best mode for carrying out the invention will be described referring to the following embodiment.

Figure 6:
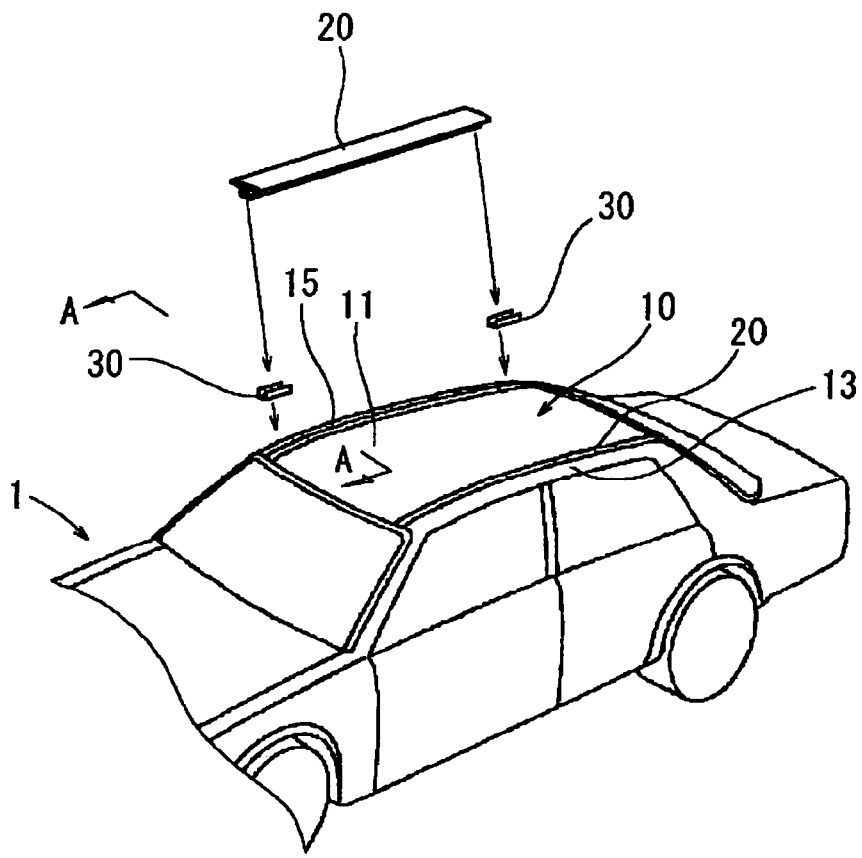
FIG. 6 is a perspective view showing a roof of an automobile in which an attaching position of the roof molding is explained.

The embodiment of the invention will be described. In this embodiment, a case where roof moldings 20 are attached to a roof panel 10 of an automobile 1 by means of molding attaching clips 30, as shown in FIG. 6, will be described. These roof moldings 20 are formed in a rectilinear shape and arranged in right and left side portions of the roof panel 10 symmetrically in a lateral direction so as to be slightly curved in a vertical direction. Opposite end portions of each the roof molding 20 in a longitudinal direction are attached to the roof panel 10 by means of the molding attaching clips 30. It is to be noted that only a right side portion of the roof panel 10 will be described for convenience of explanation, and description of a left side portion thereof will be omitted.

In this embodiment, terms "right, left, front, and rear" respectively represent corresponding directions with respect to the traveling direction of the automobile 1.

Figure 1:
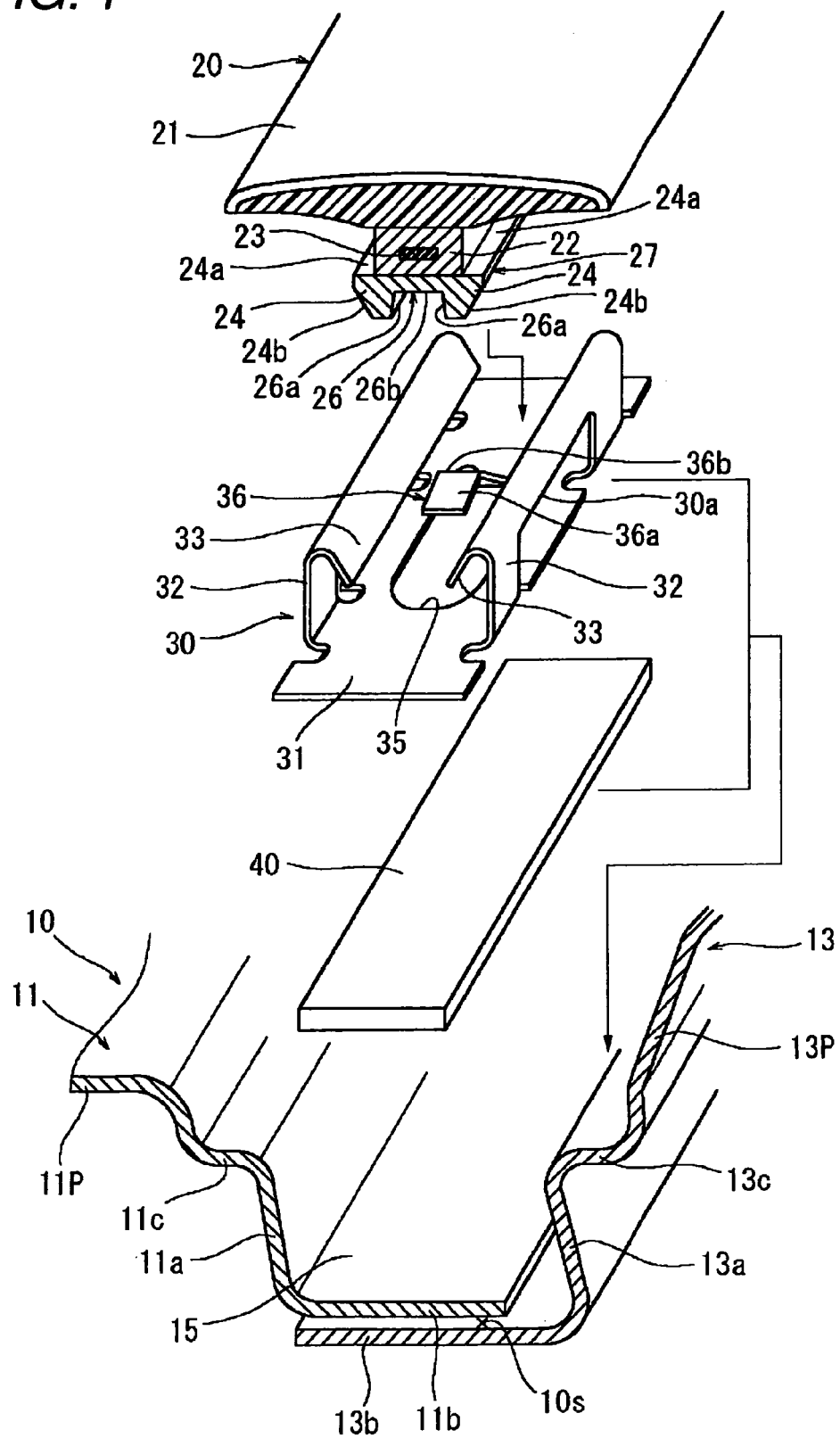
FIG. 1 is an exploded perspective view showing a molding attaching structure according to an embodiment of the invention.

To begin with, the roof panel 10 will be described. As shown in FIG. 1, the roof panel 10 includes a center panel 11 made of a metal sheet which forms a main body, and a side panel 13 made of a metal sheet which forms the right side portion.

In a side edge portion at the right side of the center panel 11, there is formed a wall portion 11a which is downwardly bent from its main portion 11P, and a junction portion 11b which is bent to the right from a lower end of the wall portion 11a.

On the other hand, in a side edge portion at the left side of the side panel 13, there is formed a wall portion 13a which is downwardly bent from its main portion 13P, and a junction portion 13b which is bent to the left from a lower end of the wall portion 13a.

The junction portion 13b of the side panel 13 is arranged below a lower face of the junction portion 11b of the center panel 11, and then, both the junction portions 11b, 13b are connected by welding or so. Additionally, a paste-like body sealer (not shown) is applied to a connected portion between the center panel 11 and the side panel 13, thereby to seal the connected portion. Moreover, a groove 15 in a concave shape extending in the longitudinal direction of the roof panel 10 is formed in the connected portion between the center panel 11 and the side panel 13.

It is to be noted that the roof panel 10 corresponds to "a panel" in this specification.

The wall portion 11a of the center panel 11 and the wall portion 13a of the side panel 13 are respectively provided with stepped portions 11c, 13c, in their upper end areas.

Figure 2:
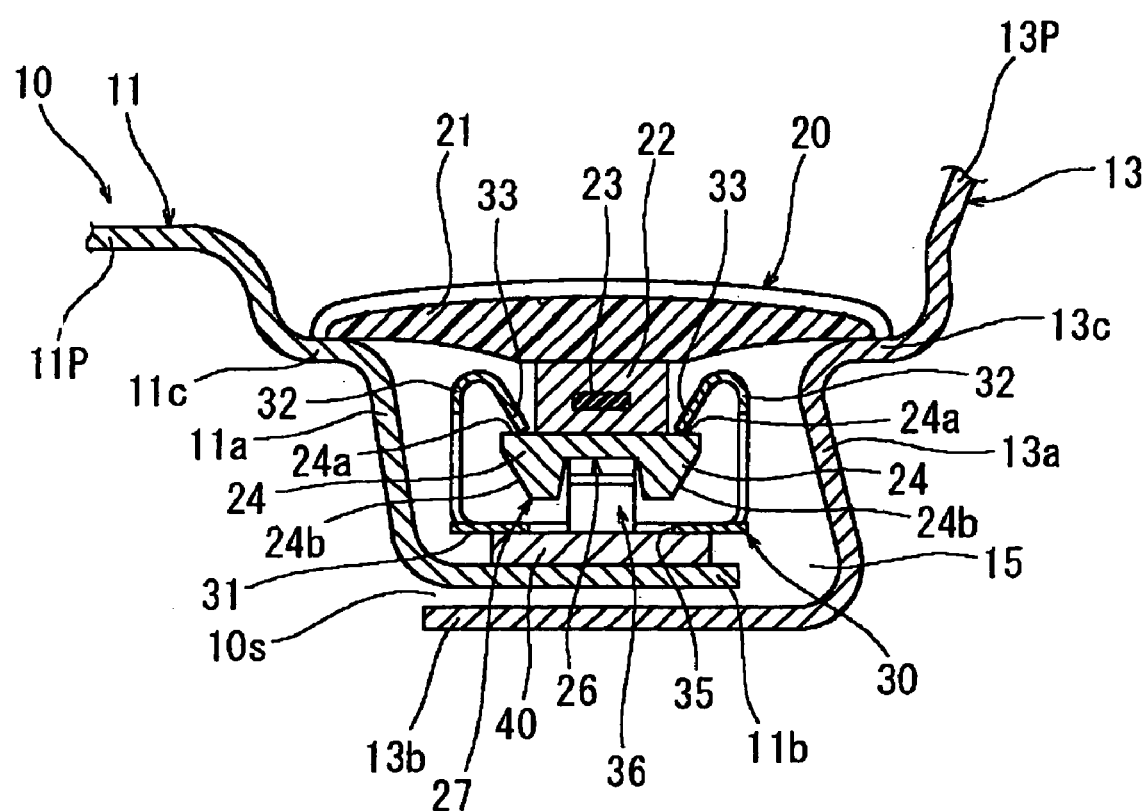
FIG. 2 is a cross sectional view taken along a line A-A in FIG. 6, showing a roof molding in an attached state.

Incidentally, in FIGS. 1 and 2, a gap 10s is formed between the junction portion 11b of the center panel 11 and the junction portion 13b of the side panel 13. In this gap 10s, a reinforcing panel member (not shown) is integrally provided in pile between both the junction portions.

Figure 7:
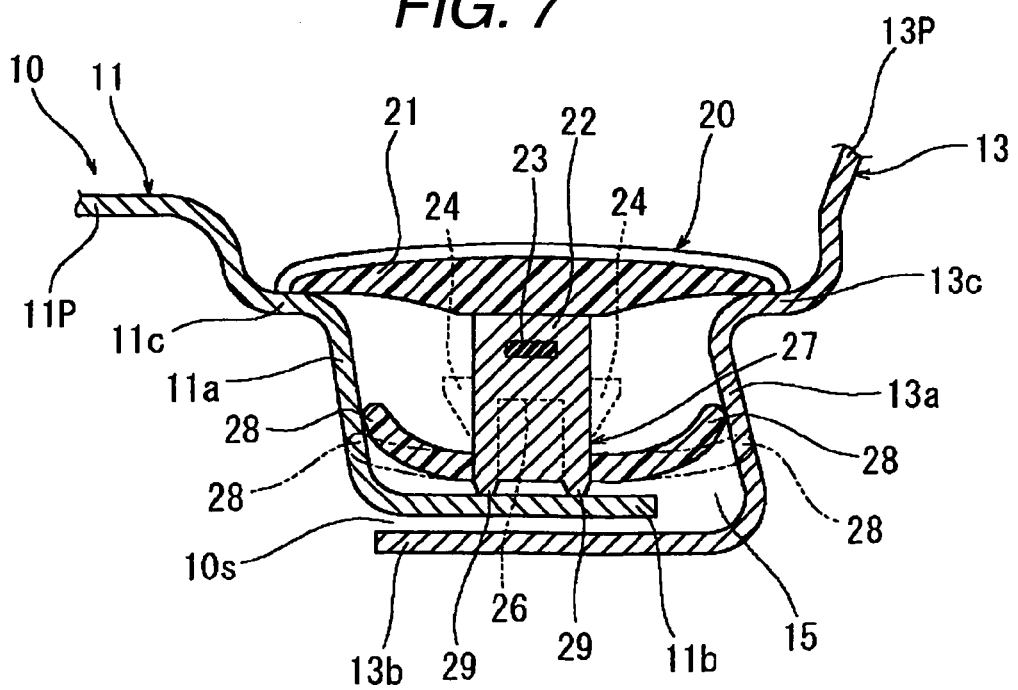
FIG. 7 is a sectional view showing a middle portion of the roof molding in a longitudinal direction, in an attached state.

Next, the roof molding 20 will be described. As shown in FIG. 7, a general portion (other portions than terminal portions which will be described below) of the roof molding 20 is formed of an elongated resin molded product which has been formed by extrusion molding from polypropylene resin, thermoplastic elastomer or the like having elasticity. The general portion includes a head portion 21 in a shape of an elongated sheet which covers the groove 15 of the roof panel 10, and a protruded main body 22 which is protruded from a back face of the head portion 21 into the groove 15 of the roof panel 10. The head portion 21 and the protruded main body 22 are integrally formed by co-extrusion molding. The head portion 21 has a durometer hardness of about HDA 60 to 80 (measured by JISK7215: a test method for the durometer hardness of plastics, the same goes hereinafter too), and the protruded main body 22 has a rigidity and a durometer hardness of about HDA 80 to 95 which is higher than that of the head portion 21.

In the terminal portion of the roof molding 20, a lower end portion of the protruded main body 22 in the general portion is cut away, as shown in FIG. 1, and the protruded main body 22 is provided, on both right and left side faces of the lower end portion thereof, with a pair of right and left locking portions 24 which are laterally symmetrically formed by insert injection molding. Both the locking portions 24 have a hardness of about HDA 80 to 95 and a rigidity, and form a portion of a projected portion (described below). A core metal 23 is embedded in an upper portion of the protruded main body 22. Moreover, each of the locking portions 24 has a substantially horizontal locking face 24a which forms an upper face thereof, and an inclined face 24b which forms a tapered face downwardly tapered from an outer end of the locking face 24a. Hereinafter, the protruded main body 22 and the locking portions 24 are generally called as a projected portion 27.

Further, a receiving groove 26 in a trapezoidal sectional shape is formed on a lower face of the projected portion 27 of the roof molding 20. The receiving groove 26 is defined by both wall faces 26a which are tapered so as to gradually narrow a groove width (a width in a lateral direction) toward an upward direction, and a bottom face 26b which forms a substantially horizontal plane between upper ends of both the wall faces 26a. A thin surface layer having a durometer hardness of about HDD 40 to 50 according to JISK 7215 is integrally formed on an outer face of the head portion 21 by the co-extrusion molding. This surface layer enhances scratch resistance of the outer face of the head portion 21 without hindering elastic deformation of the roof molding 20.

It is to be noted that the roof molding 20 corresponds to "a molding" in this description.

The general portion which is the middle portion of the roof molding 20 in the longitudinal direction except the opposite end portions, which are adapted to be attached to the roof panel 10 by means of the molding attaching clips 30 (described below), is inserted into the groove 15 of the roof panel 10, as shown in FIG. 7. Specifically, a pair of right and left elastic pieces 28 which are elastically deformable have been integrally formed on occasion of extrusion molding, on both right and left side faces of the lower portion of the protruded main body 22, in the middle portion (the general portion) of the roof molding 20 in the longitudinal direction. Both the elastic pieces 28 have a hardness of about HDA 60 to 80. In FIG. 7, a two-dot chain line 28 shows the elastic pieces 28 in a free state. Moreover, an appropriate number (two in FIG. 7) of ridges 29 are projected from the lower face of the protruded main body 22 of the roof molding 20.

On the other hand, in the terminal portion of the roof molding 20 shown in FIG. 7 in the longitudinal direction, a substantially lower half portion of the protruded main body 22 is cut away, and the above described locking portions 24 are formed in the remaining lower end portion of the protruded main body 22, by insert injection molding (See FIG. 1).

Figure 3A:
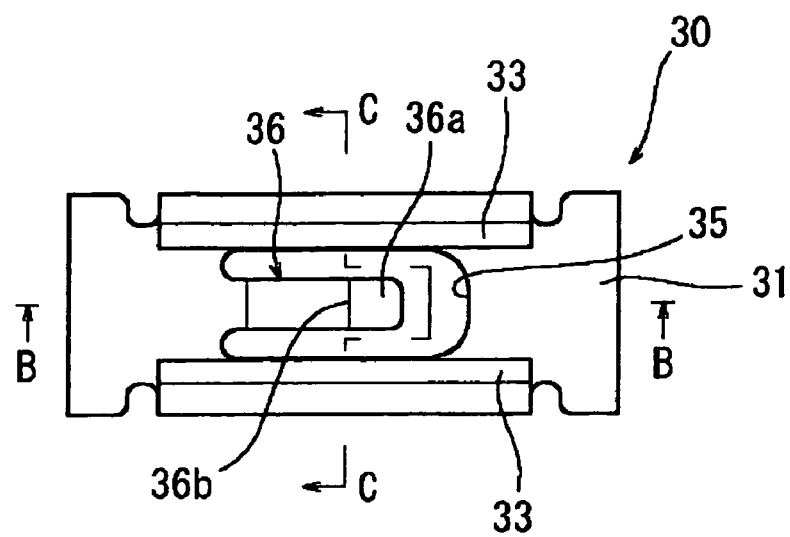
Figure 3B:
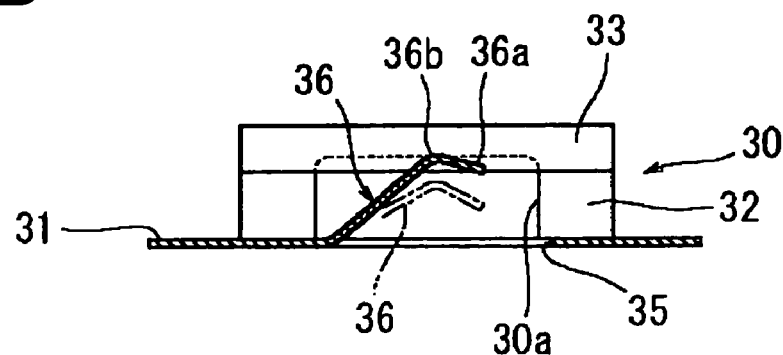
Figure 3C:
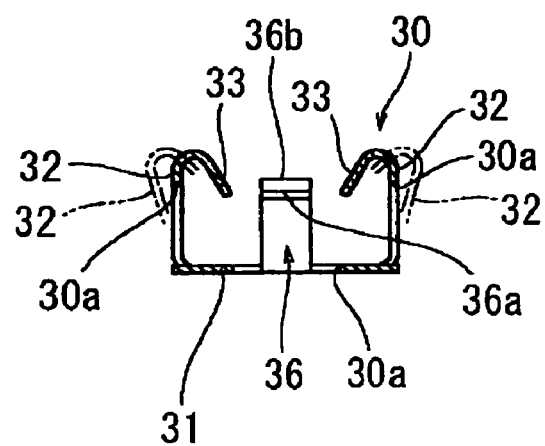

Next, the molding attaching clip 30 will be described. As shown in FIGS. 3A to 3C, the molding attaching clip 30 is formed of a sheet metal member having resiliency, by press forming. The molding attaching clip 30 has a fixed portion 31 in a shape of a substantially rectangular plate which is longer in the longitudinal direction in an attached state, a pair of right and left wall portions 32 in a shape of a substantially rectangular plate which are elastically deformable and folded upright from both right and left side portions of the fixed portion 31 (both right and left sides of the concave groove 15 in FIG. 1, in the attached state), and a pair of right and left engaging portions 33 which are folded in a turned-back manner from upper ends of the pair of wall portions 32.

Bonding means 40 such as a pressure sensitive double-faced adhesive tape having thermosetting property is provided on a back face of the fixed portion 31. The fixed portion 31 is fixed by attaching it to a bottom face of the groove 15 of the roof panel 10 (that is, on the junction portion 11b of the center panel 11), with the bonding means 40 (See FIG. 2).

Both the wall portions 32 are formed so as to be elastically deformable, as shown by a two-dot chain line 32 in FIG. 3C. Each of the wall portions 32 is provided with a side opening 30a in an elongated rectangular shape, in a lower half portion thereof.

Both the engaging portions 33 are formed in a manner extending diagonally downwardly from the upper ends of both the wall portions 32 toward each other (See FIG. 3C). Both the engaging portions 33 are adapted to be engageable with the pair of locking portions 24 of the roof molding 20, utilizing elastic deformation of the wall portions 32 (See FIG. 2).

The fixed portion 31 is formed with a cut-in groove 35 (See FIG. 3A) which is cut in a substantially U-shape in its outer contour, and a projecting piece projecting forward is erected in the cut-in groove 35, by cutting it out diagonally upwardly from the fixed portion at one end of the cut-in groove 35 in the longitudinal direction, thereby to form an elastically deformable guide portion 36 which is projected in a direction away from the bottom face of the groove 15 of the roof panel 10. A tip end portion 36a of the guide portion 36 is bent by way of a curved portion 36b diagonally downwardly (See FIG. 3B). The curved portion 36b of the guide portion 36 is formed so that elastic and slidable contact with the bottom face 26b of the receiving groove 26 of the roof molding 20 can be made. The curved portion 36b has a substantially circular arc shape, and is not provided with an edge.

Now, a process for attaching the roof molding 20 to the roof panel 10 will be described.

As a first step, before the roof panel 10 is painted, the fixed portion 31 of the molding attaching clip 30 is bonded to the bottom face of the groove 15 of the roof panel 10 with the bonding means 40 (See FIG. 4A). The bonding means 40 includes, for example, the pressure sensitive double-faced adhesive tape having thermosetting property to be bonded to the back face of the fixed portion 31.

After the molding attaching clip 30 has been bonded, the roof panel 10 is painted, and the adhesive tape as the bonding means 40 is set utilizing heat in baking process of the paint, whereby the molding attaching clip 30 is fixed to the roof panel 10.

Then, in order to attach the roof molding 20 to the roof panel 10, the forward terminal portion of the roof molding 20 is pressed to be inserted into the groove 15 of the roof panel 10, from a state as shown by a two-dot chain line 20 in FIG. 4A. In a case where an inserted position of the roof molding 20 (the centerline of the roof molding) is aligned with the attaching centerline L, both the locking portions 24 (more specifically, the inclined faces 24b) of the roof molding 20 are brought into contact with both the engaging portions 33 of the molding attaching clip 30 (See a solid line 20 in FIG. 4A).

As the roof molding 20 is further pushed and inserted into the groove 15 from this state, the pair of engaging portions 33 of the molding attaching clip 30 are pressed by the pair of locking portions 24 of the roof molding 20 so as to spread outwardly, whereby both the wall portions 32 of the molding attaching clip 30 are elastically deformed in a spreading direction (See FIG. 4B).

After both the locking portions 24 have passed by both the engaging portions 33, both the wall portions 32 of the molding attaching clip 30 are elastically restored, whereby both the locking portions 24 are engaged with both the engaging portions 33 (See FIG. 2). Specifically, both the engaging portions 33 of the molding attaching clip 30 are respectively locked on the locking faces 24a of both the locking portions 24 of the roof molding 20, whereby the roof molding 20 is prevented from withdrawal. At the same time, the head portion 21 of the roof molding 20 is brought into contact with the stepped portions 11c, 13c of the roof panel 10 thereby to cover the groove 15.

Also at the same time, while the roof molding 20 is inserted, the curved portion 36b (See FIG. 3B) of the guide portion 36 of the molding attaching clip 30 is brought into contact with the bottom face 26b of the receiving groove 26 in the projected portion 27 of the roof molding 20, and is slightly move in the longitudinal direction relative to the bottom face 26b. Then, the guide portion 36 is elastically deformed (See a two-dot chain line 36 in FIG. 3B). After both the locking portions 24 have passed by both the engaging portions 33, the guide portion 36 is elastically restored, whereby the guide portion 36 is engaged with the receiving groove 26 to bring the roof molding 20 into engagement with the molding attaching clip 30.

In the above described manner, it is possible to properly attach the roof molding 20 to the roof panel 10.

On this occasion, because the protruded main body 22 of the roof molding 20 has a higher hardness and rigidity than the head portion 21, the projected portion 27 can be attached stably without being deformed during the attaching work, and is kept in a stably fitted state after it has been completely attached. Moreover, because the locking portions 24 are formed by insert injection molding, it is possible to mold the locking portions 24 with accurate sizes, and a backlash does not occur when they are engaged with the molding attaching clip 30.

Thereafter, while the roof molding 20 is pressed into the groove 15, the pressing action is moved from the forward end to the rearward end. At the rearward end, the roof molding 20 is engaged with the molding attaching clip 30 in the same manner as at the forward end, whereby an entire body of the roof molding 20 is fitted. On this occasion, the roof molding 20 is deformed into a vertically curved shape according to the shape of the groove 15 in the longitudinal direction, and the roof molding 20 favorably follows the shape of the groove 15, since the roof molding has been formed of elastically deformable material by extrusion molding.

In the meantime, the middle portion of the roof molding 20 in the longitudinal direction is inserted into the groove 15 of the roof panel 10 as shown in FIG. 7, and both the elastic pieces 28 are elastically deformed to be butted against the respective wall portions 11a, 13a of the groove 15, whereby the roof molding 20 is attached to the roof panel 10 by means of elastic repulsive force of the elastic pieces 28. Moreover, the ridges 29 of the roof molding 20 are brought into contact with the bottom face of the groove 15 of the roof panel 10, and at the same time, the head portion 21 of the roof molding 20 is brought into contact with both the stepped portions 11c, 13c of the roof panel 10 thereby to cover the groove 15.

Figure 5A:
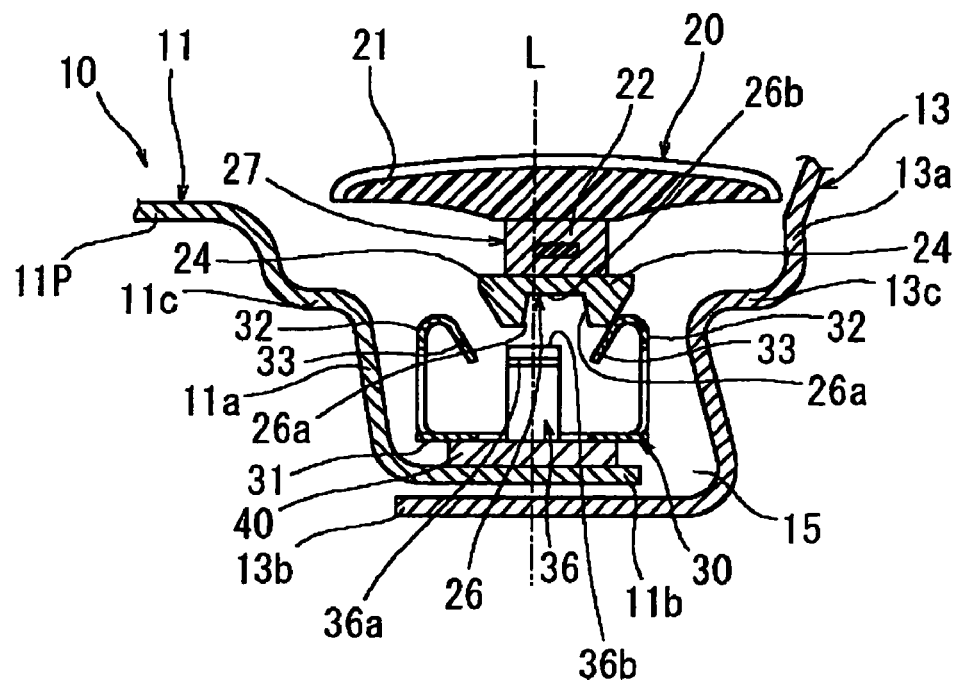

By the way, in some cases, an inserted position of the roof molding 20 with respect to the molding attaching clip 30 is displaced to the right or to the left from the attaching centerline L (See FIG. 5A).

Figure 5B:
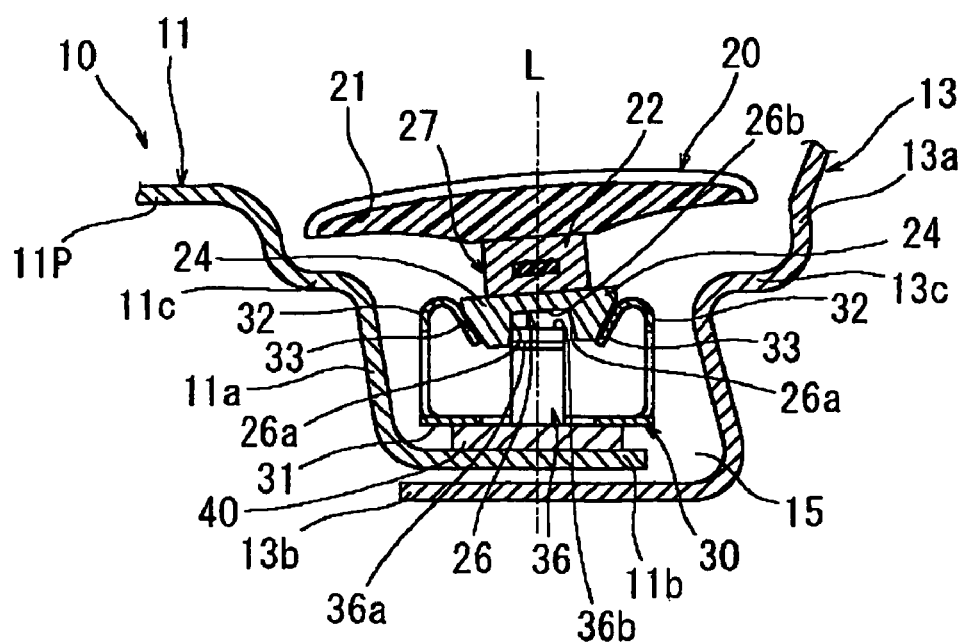

Therefore, the case where the inserted position of the roof molding 20 is displaced to the right (the right side in the drawing) from the attaching centerline L will be described. In this case, when the roof molding 20 is forced to be inserted into the groove 15 of the roof panel 10, the locking portion 24 of the roof molding 20 at the right side comes into contact with the engaging portion 33 of the molding attaching clip 30 at the right side (See FIG. 5A). When the roof molding 20 is further inserted from this state, the roof molding 20 is inclined downwardly to the left while the relevant locking portion 24 is kept in contact with the engaging portion 33 at the right side. In a state where the roof molding 20 has been inclined downwardly to the left, both the locking portions 24 are brought into contact with both the engaging portions 33. However, the locking portion 24 at the left side cannot pass by the engaging portion 33 at the left side, because the locking portion 24 at the left side is butted against the curved portion 36b of the guide portion 36. When the roof molding 20 is further pushed into the groove 15 from this state, a pushing force is concentrated on the right side of the roof molding 20, and as a result, the inclination is gradually corrected to attain a horizontal posture (See FIG. 5B).

Then, the contact between the locking portion 24 at the left side and the curved portion 36b of the guide portion 36 is released, so that the guide portion 36 of the molding attaching clip 30 is positioned just below the receiving groove 26 of the roof molding 20.

A height of the engaging portion 33 (a distance from an upper face of the fixed portion 31 to a lower end of the engaging portion 33) is smaller than a height of the curved portion 36b (a distance from the upper face of the fixed portion 31 to an upper face of the curved portion 36b). A difference between the height of the engaging portion 33 and the height of the curved portion may be preferably 1 mm to 10 mm, although it varies depending on a size of the roof molding 20. In this manner, it is possible to reliably correct an inclination of the roof molding 20 by means of the guide portion 36, in the case where the inserted position of the roof molding 20 is displaced with respect to the attaching centerline L.

As the roof molding 20 is further pushed into the groove 15 from this state, due to sliding movement between the pair of engaging portions 33 of the molding attaching clip 30 and the pair of locking portions 24 of the roof molding 20, both the wall portions 32 of the molding attaching clip 30 are elastically deformed in a spreading direction, in the same manner as described above (See FIG. 4B).

When both the locking portions 24 have passed by both the engaging portions 33, both the wall portions 32 of the molding attaching clip 30 are elastically restored and the engaging portions 33 are engaged with the locking portions 24, thereby to prevent withdrawal of the roof molding 20. At the same time, the guide portion 36 of the molding attaching clip 30 is engaged with the receiving groove 26 of the roof molding 20, whereby the roof molding 20 is secured. Then, the head portion 21 of the roof molding 20 is brought into contact with both the stepped portions 11c, 13c of the roof panel 10 thereby to cover the groove 15 (See FIG. 2).

Accordingly, even in the case where the inserted position of the roof molding 20 is displaced to the right from the attaching centerline L, it is possible to properly attach the roof molding 20 to the roof panel 10. Naturally, even in the case where the inserted position of the roof molding 20 is displaced to the left from the attaching centerline L, it is possible to properly attach the roof molding 20 to the roof panel 10 with the same action as described above.

According to the molding attaching structure as described above, on occasion of engaging the roof molding 20 with the molding attaching clip 30, even in the case where the inserted position is displaced, the roof molding 20 is positioned so that the pair of locking portions 24 of the roof molding 20 and the pair of engaging portions 33 of the molding attaching clip 30 take relative positions where they can be engaged with each other, by butting the locking portions 24 of the roof molding 20 against the guide portion 36 of the molding attaching clip 30. Therefore, even in the case where the inserted position of the roof molding 20 is displaced, the worker can attach the roof molding 20 to the roof panel 10 easily and reliably, without paying excessive attention.

Moreover, according to the molding attaching clip 30 as described above, on occasion of engaging the molding attaching clip 30 with the roof molding 20, in the case where the inserted position is displaced, the roof molding 20 is positioned so that the pair of locking portions 24 of the roof molding 20 and the pair of engaging portions 33 of the molding attaching clip 30 take relative positions where they can be engaged with each other, by butting the locking portions 24 of the roof molding 20 against the guide portion 36 of the molding attaching clip 30. Therefore, even in the case where the inserted position of the roof molding 20 is displaced, it is possible to reliably attach the roof molding 20 to the roof panel 10.

Further, according to the roof molding 20 as described above, on occasion of engaging the roof molding 20 with the molding attaching clip 30, in the case where the inserted position is displaced, the roof molding 20 is positioned so that the pair of locking portions 24 of the roof molding 20 and the pair of engaging portions 33 of the molding attaching clip take relative positions where they can be engaged with each other, by butting the locking portions 24 of the roof molding 20 against the guide portion 36 of the molding attaching clip 30. Therefore, even in the case where the inserted position of the roof molding 20 is displaced, it is possible to reliably attach the roof molding 20 to the roof panel 10.

The invention is not limited to the above described embodiment, but modification can be made within a scope not deviated from a gist of the invention. For example, the invention can be applied to the moldings of various types, besides the roof molding 20, such as a window molding, a belt molding, a protector molding, etc., of an automobile or the like. Therefore, the panel is not limited to the roof panel 10 of the automobile 1. Moreover, the molding attaching clip 30 is not necessarily made of a metal sheet, but can be made of resin. Further, the means for bonding the molding attaching clip 30 to the roof panel 10 is not limited to the bonding means 40, but any means that can bond the molding attaching clip 30 to the roof panel 10 may be employed.

Still further, instead of forming the locking portions 24 and the receiving groove 26 of the roof molding 20 by insert injection molding, it is possible to form the roof molding 20 by co-extrusion molding into such a shape as shown by a dotted line in FIG. 7, and thereafter, to form the locking portions 24 and the receiving groove 26 in the terminal portions, by cutting away the lower portion of the protruded main body 22 longitudinally, slightly above the elastic pieces 28. In this case, the protruded main body 22 and the locking portions 24 are formed as an integral structure, and hence, connecting strength between both the portions is enhanced. Moreover, by cutting away a part of the protruded main body 22 in the terminal portions, it is possible to easily form the locking portions 24 and the receiving groove 26.

Figure 8:
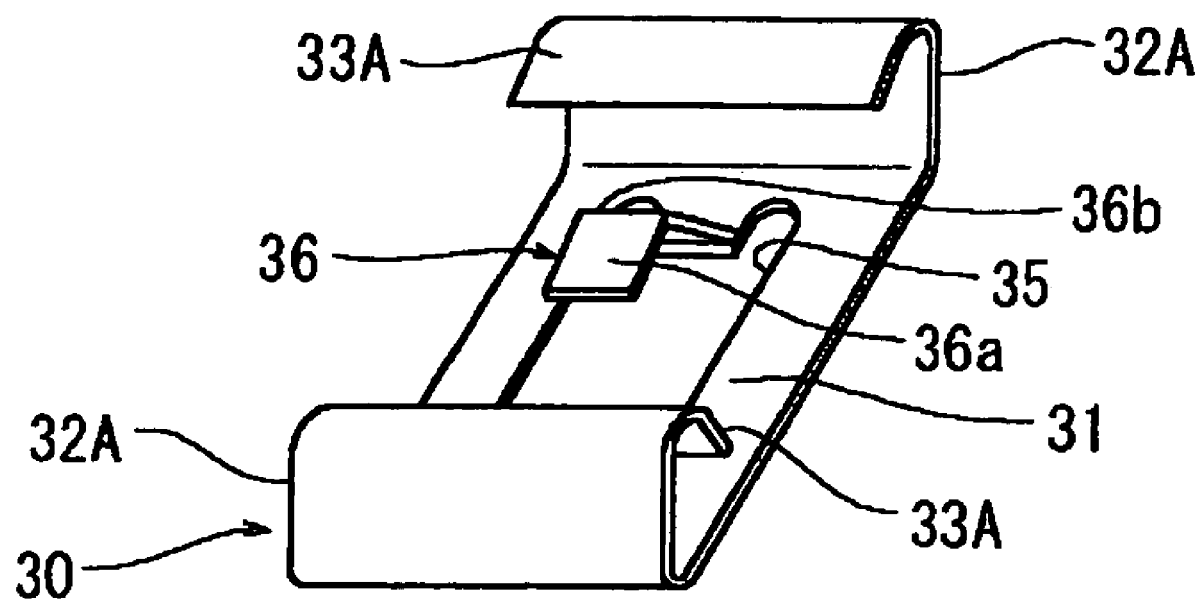
FIG. 8 is a perspective view showing a modification of the molding attaching clip.
Figure 9A:
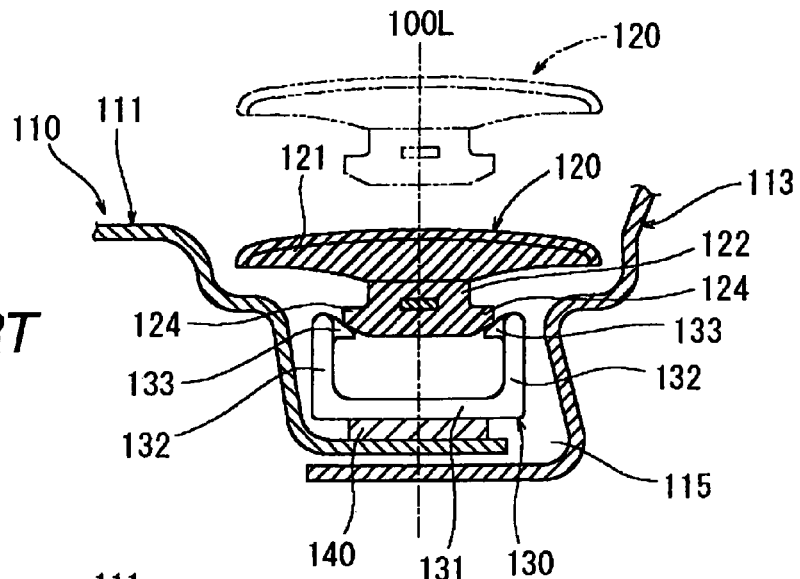
Figure 9B:
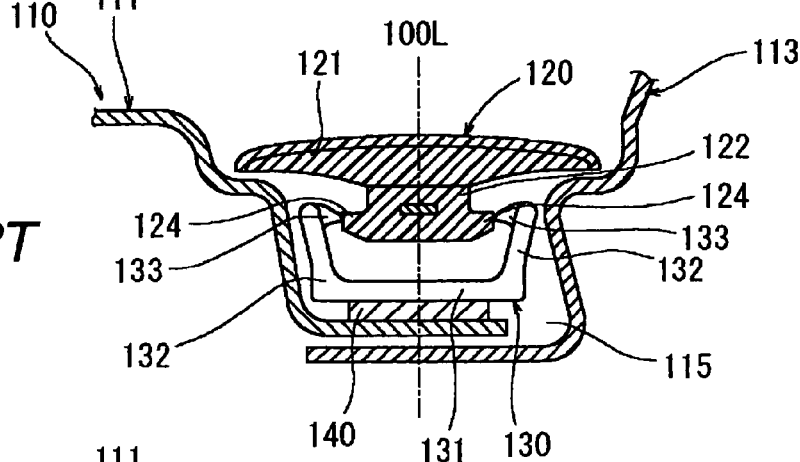
Figure 9C:
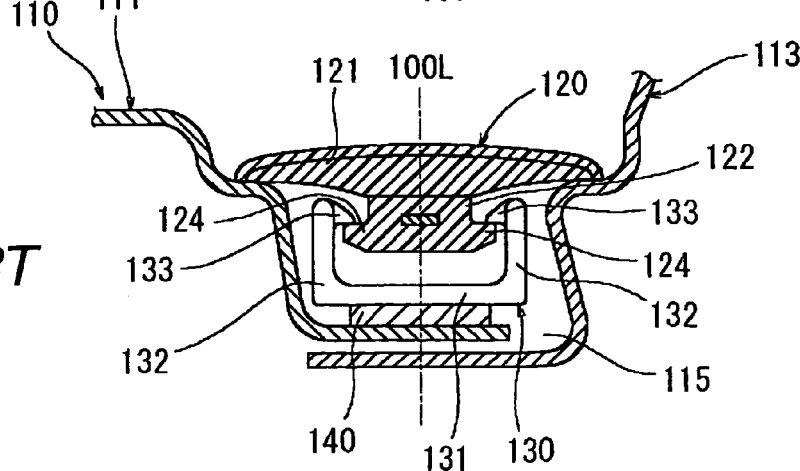
Figure 10A:
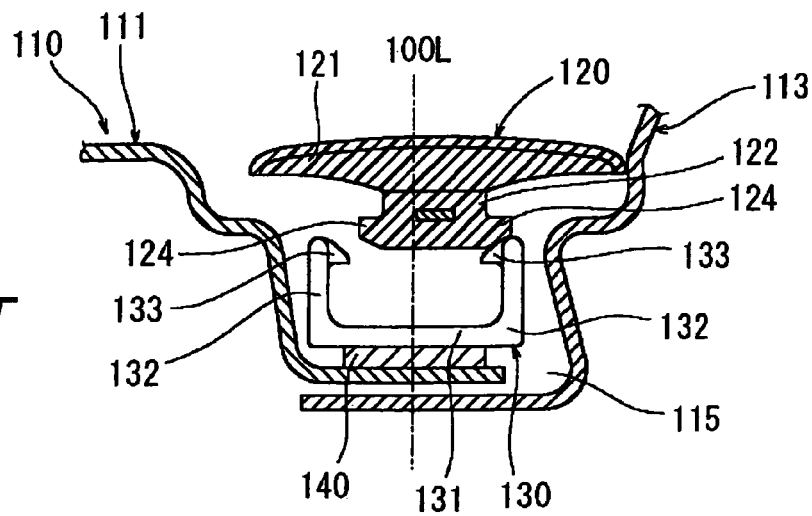
Figure 10B:
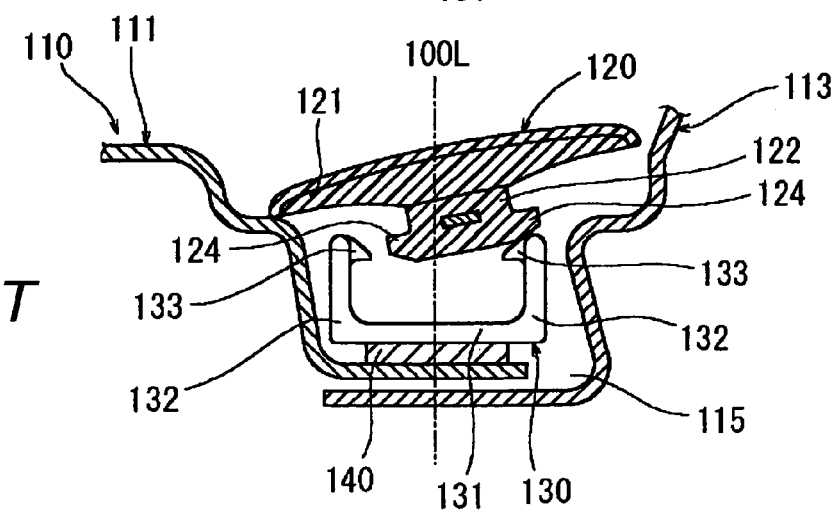
Figure 10C:
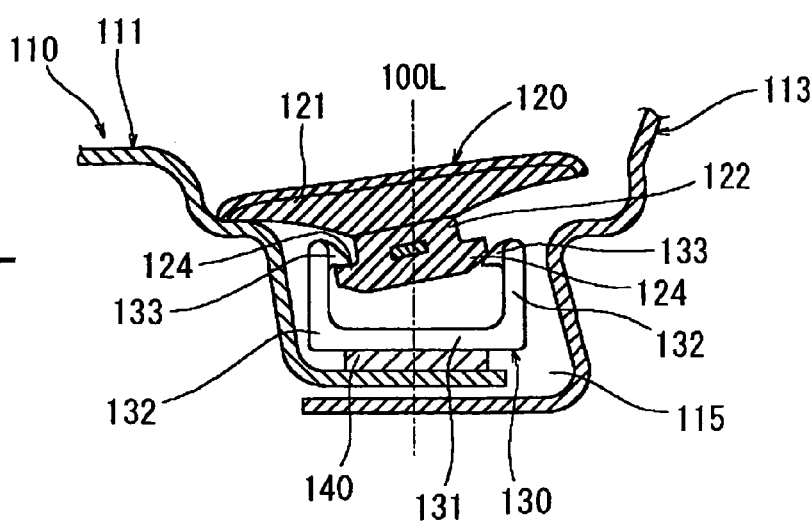

Although the projected portion 27 of the roof molding 20 is provided with the pair of right and left locking portions 24 in the above described embodiment, it is also possible to provide a pair of front and rear locking portions. In this case, the molding attaching clip 30 may be so designed, as shown in FIG. 8, as to have a pair of front and rear wall portions (denoted with reference numeral 32A) in a substantially elongated rectangular plate which are elastically deformable and folded so as to be erected from both front and rear sides of the fixed portion 31, and a pair of front and rear engaging portions (denoted with reference numeral 33A) which are folded back in a turned-back manner on opposed faces of the pair of wall portions 32A corresponding to the pair of front and rear locking portions of the roof molding 20. Moreover, although the receiving groove 26 of the roof molding 20 is formed in a trapezoidal sectional shape having the tapered wall faces 26a in the above described embodiment, it is possible to form the receiving groove 26 in a rectangular sectional shape having both wall faces in parallel to each other.

Further, the tip end portion 36a of the guide portion 36 is not necessarily folded diagonally downwardly by way of the curved portion 36b, but may extend in a horizontal direction, for example.

Still further, the guide portion 36 is not necessarily formed by cutting, but the guide portion can be formed by attaching a separate guide body to the fixed portion 31.

Still further, the shapes of the cut-in groove 35 and the side opening 30a are not limited to the described shapes but can be appropriately modified.

The invention claimed is:

1. A molding attaching structure comprising:
    a molding attaching clip fixed to a panel; and
    a molding which engages with the molding attaching clip fixed to the panel to thereby be fitted along a concave groove formed in the panel so as to cover the groove from outside,
    wherein the molding attaching clip is formed of a member having resilience, the molding attaching clip comprising:
    a fixed portion fixed in the groove of the panel,
    a pair of elastically deformable wall portions erected from the fixed portion in a direction away from a bottom face of the groove of the panel and separated from each other in a state where the fixed portion is attached to the panel,
    a pair of engaging portions provided on the pair of wall portions, and
    an elastically deformable guide portion projected from the fixed portion in a direction away from the bottom face of the groove of the panel, the guide portion including a curved portion and including a cantilever beam which has a tip end portion as a free end at a position above and away from the fixed portion,
    wherein the molding comprises:
    a head portion for covering the groove of the panel, and a projected portion protruded from a back face side of the head portion into the groove of the panel, the projected portion including a protruded main body,
    a pair of locking portions provided on both side faces of the protruded main body and engaged with the pair of engaging portions of the molding attaching clip by means of elastic deformation of the wall portions, and
    a receiving groove arranged in a longitudinal direction, the receiving groove being formed on a lower face of the projected portion and being configured to receive the guide portion of the molding attaching clip such that the curved portion of the guide portion slidingly contacts the bottom face of the receiving groove in the longitudinal direction, and
    wherein, when engaging the molding with the molding attaching clip, the molding is positioned so that the pair of locking portions can be engaged with the pair of engaging portions, by butting the receiving groove of the molding against the guide portion.

2. A molding attaching clip for attaching a molding to a panel by being engaged with the molding to be fitted along a concave groove formed in the panel so as to cover the groove from outside, the molding attaching clip is formed of a member having resilience, the molding attaching clip comprising:
    a fixing portion to be fixed in the groove of the panel;
    a pair of elastically deformable wall portions erected from the fixing portion in a direction away from a bottom face of the groove of the panel and separated from each other in a state where the fixing portion is attached to the panel; and
    a pair of engaging portions provided on the pair of wall portions to be engaged with a pair of locking portions provided on the molding by means of elastic deformation of the wall portions,
    wherein the fixing portion comprises an elastically deformable guide portion projected from the fixing portion in a direction away from the bottom face of the groove of the panel, the guide portion including a curved portion and including a cantilever beam which has a tip end portion as a free end at a position above and away from the fixing portion, and adapted to enter into a receiving groove arranged in a longitudinal direction which is formed in the molding such that the curved portion of the guide portion slidingly contacts the bottom face of the receiving groove in the longitudinal direction, and wherein, when engaging the molding, the molding is positioned so that the pair of locking portions can be engaged with the pair of engaging portions, by butting the receiving groove of the molding against the guide portion.

3. The molding attaching clip according to claim 2, wherein the engaging portions are respectively formed on opposed faces of the pair of wall portions.

4. The molding attaching clip according to claim 3, wherein each respective engaging portion is provided on one of the wall portions and is inclined diagonally downwardly toward the other respective wall portion.

5. The molding attaching clip according to claim 2, wherein a thermosetting double-faced adhesive tape is further provided on a back face of the fixing portion.

6. The molding attaching clip according to claim 2, wherein the guide portion is formed by cutting and erecting a part of the fixing portion.

7. The molding attaching clip according to claim 2, wherein the guide portion has a curved portion in a substantially circular arc shape at its tip end side, and a tip end portion of the guide portion is folded diagonally downwardly from the curved portion.

8. A molding to be attached to a panel along a concave groove formed in the panel by being engaged with a molding attaching clip provided in the concave groove so as to cover the groove from outside, the molding comprising:

a head portion for covering the groove of the panel; and a projected portion protruded from a back face side of the head portion into the groove of the panel, wherein the projected portion comprises a protruded main body, and a pair of locking portions provided on both side faces of the protruded main body and adapted to be engaged with a pair of engaging portions provided on the molding attaching clip by means of elastic deformation of the wall portions, wherein the molding attaching clip is formed of a member having resilience, wherein the projected portion has on its lower face a receiving groove arranged in a longitudinal direction being configured to receive an elastically deformable guide portion provided on the molding attaching clip, the guide portion including a curved portion and including a cantilever beam which has a tip end portion as a free end at a position above and away from the fixed portion such that the curved portion of the guide portion slidingly contacts the bottom face of the receiving groove in the longitudinal direction, and wherein, when engaging with the molding attaching clip, the molding is positioned so that the pair of locking portions can be engaged with the pair of engaging portions, by butting the receiving groove of the molding against the guide portion.

9. The molding according to claim 8, wherein the locking portions are symmetric.

10. The molding according to claim 8, wherein each of the locking portion has a locking face which forms its upper face, and an inclined face which extends diagonally downwardly from an outer end of the locking face so as to reduce a width of the locking portion as it extends a downward direction.

11. The molding according to claim 8, wherein the receiving groove has a trapezoidal sectional shape.

12. The molding according to claim 8, wherein the head portion has a durometer hardness of HDA 60 to 80 according to JIS K 7215, and the projected portion has a durometer hardness of HDA 80 to 95 according to JIS K 7215.

13. The molding according to claim 8, wherein the head portion has a surface layer integrally formed on its surface, and the surface layer has a durometer hardness of HDD 40 to 50 according to JIS K 7215.

14. The molding according to claim 8, wherein the molding is a roof molding to be fitted along a groove on a roof of a vehicle.

15. A molding attaching structure according to claim 1, wherein the molding attaching clip is formed of a sheet metal member having resilience.

16. A molding attaching clip according to claim 2, wherein the attaching molding clip is formed of a sheet metal member having resilience.

17. A molding according to claim 8, wherein the molding attaching clip is formed of a sheet metal member having resilience.

* * * * *